United States Patent [19]
Rodal

[11] Patent Number: 5,650,785
[45] Date of Patent: Jul. 22, 1997

[54] LOW POWER GPS RECEIVER

[75] Inventor: Eric B. Rodal, Cupertino, Calif.

[73] Assignee: Trimble Navigation Limited, Sunnyvale, Calif.

[21] Appl. No.: 332,852

[22] Filed: Nov. 1, 1994

[51] Int. Cl.$^6$ ........................................ G01S 5/02
[52] U.S. Cl. .......................... 342/357; 342/352
[58] Field of Search ................... 342/357, 352, 342/189, 6; 455/12.1

[56]  References Cited

U.S. PATENT DOCUMENTS

| | | |
|---|---|---|
| 4,340,973 | 7/1982 | Umetsu . |
| 4,384,361 | 5/1983 | Masaki . |
| 4,457,006 | 6/1984 | Maine ........................... 375/87 |
| 4,506,386 | 3/1985 | Ichikawa et al. . |
| 4,631,496 | 12/1986 | Borras et al. . |
| 4,719,619 | 1/1988 | Crookshanks ...................... 370/70 |
| 4,811,362 | 3/1989 | Yester, Jr. et al. . |
| 4,910,752 | 3/1990 | Yester, Jr. et al. . |
| 4,990,924 | 2/1991 | McMullen et al. . |
| 5,101,510 | 3/1992 | Duckeck . |
| 5,134,407 | 7/1992 | Lorenz et al. ....................... 342/352 |
| 5,296,861 | 3/1994 | Knight ............................ 342/357 |
| 5,329,549 | 7/1994 | Kawasaki ........................... 375/1 |

*Primary Examiner*—Thomas H. Tarcza
*Assistant Examiner*—Dao L. Phan
*Attorney, Agent, or Firm*—David R. Gildea

[57]  ABSTRACT

A low power GPS receiver, including an RF section to receive a GPS signal having information for determining a location fix and to issue an IF signal, a correlator system to correlate an internal replica signal to the IF signal and to issue a correlation signal including location and signal strength information, a microprocessor system to receive the correlation signal, to read the signal strength, and to provide a location fix, and an on/off modulator to receive a duty cycle factor from the microprocessor system and to on/off modulate the operating power to the RF section to provide a minimum signal strength for a valid location fix. The off time duration of the modulation is shorter than the time duration of the interval used to correlate the IF signal enabling the GPS receiver to continue to correlate the IF signal and to provide the location fixes while the RF section operating power is reduced by the duty cycle factor.

16 Claims, 4 Drawing Sheets

LOW POWER GPS RECEIVER

FIELD OF THE INVENTION

The invention relates generally to Global Positioning System receivers and more particularly to a Global Positioning System receiver and a method for low power consumption.

BACKGROUND OF THE INVENTION

Global Positioning System (GPS) provides a worldwide, 24 hour, location service. The system includes multiple GPS satellites to broadcast location signals, control stations to monitor and control the satellites, and a GPS receiver to receive the signals. Commercial Global Positioning System (GPS) receivers now are used to provide accurate location information in many navigation, tracking, and timing applications. A GPS antenna that is a part of a GPS receiver must have a line of sight to a GPS satellite to receive the GPS signal from that satellite.

GPS location is based on one-way ranging from the GPS satellites to the GPS antenna. Ranges are measured to four satellites simultaneously in view by tracking (correlating) the frequency and the time of arrival (TOA) of the incoming GPS signal to a receiver-generated replica signal. With four ranges, the receiver can determine four unknowns, typically latitude, longitude, altitude, and an adjustment to the replica. The ranges are called "pseudoranges" because the actual distances to the GPS satellite are not known until the internal replica has been adjusted. Time of day is computed from the adjustment to the TOA of the replica. If the receiver is given other information, such as an altitude, or a precise time, fewer than four pseudoranges are needed.

Each GPS satellite broadcasts its position in a signal having a carrier frequency at approximately 1.575 GHz. The signal is modulated by a PRN sequence of 1023 chips, repeating at a 1 millisecond time interval. Each satellite uses a different PRN sequence, thus enabling a GPS receiver to distinguish the GPS signals from the different GPS satellites. The frequency of the signal received from each GPS satellite will have a Doppler shift due to the relative velocity between the GPS satellite and the GPS antenna. A velocity and a direction for the GPS antenna may be determined from the rate of change of the location or from the rate of change of the pseudoranges after accounting for the Doppler shift due to the motion of the satellite.

Power consumption is an important figure of merit for a GPS receiver. A low power consumption is good for a GPS receiver that depends upon a battery for a power source. To achieve low power, some GPS receivers have a normal mode where the GPS signal is correlated and a location fix is provided and a standby mode where power consumption is lower than in the normal mode. Some GPS receivers reduce the average power consumption in the receiver by alternating between a time duration in the normal mode and a time duration in the standby mode. A limitation of the GPS receivers using a standby mode to reduce power consumption is that the GPS receiver cannot correlate the GPS signals or provide a location fix during the time duration in the standby mode.

What is needed is a GPS receiver apparatus and a method for reducing power in a GPS receiver while the GPS receiver continues to correlate GPS satellite signals and to provide a location fix to a user.

SUMMARY OF THE PRESENT INVENTION

It is therefore an object of the present invention to provide a GPS receiver having a low power consumption while the GPS receiver continues to correlate a GPS satellite signal and to provide a location fix to a user.

Another object is to provide a GPS receiver having an on/off modulator to on/off modulate the operating power in an RF section, where the off time duration is less than a time duration used to correlate to the GPS signal.

Another object is to provide a GPS receiver having an on/off modulator to adjust a duty cycle of the operating power in the RF section by adjusting the off time duration while holding the on/off cycle time duration approximately constant.

Another object is to provide a GPS receiver having an on/off modulator to adjust the duty cycle of the operating power in the RF section by adjusting the on/off cycle time duration while holding the off time duration approximately constant.

Briefly, the preferred embodiment includes a GPS antenna to receive a GPS signal from one or more GPS satellites and to provide an antenna signal, a preamp to receive the antenna signal and to provide an amplified signal, a frequency downconverter to receive the amplified signal and to issue an IF signal, a quantizer to receive the IF signal and to provide a quantized IF signal, a correlator section to receive the quantized IF signal and to provide a correlation signal having information for determining the location of the GPS antenna and for a signal strength of the IF signal, and a microprocessor system to receive the correlation signal and to provide a location fix in a user output signal. The correlation signal represents the correlation of the IF signal to an internally generated replica signal over a time duration called a "predetection interval." A local oscillator system provides one or more local oscillator signals to the frequency downconverter for use in shifting the frequency of the antenna signal to the IF frequency. The, preamp, the frequency downconverter, and the quantizer are RF circuits in the RF section.

The microprocessor system determines a duty cycle factor that reduces the IF signal strength to the minimum signal strength where the correlator system can continue to provide valid information for determining location. The microprocessor system passes the duty cycle factor to an on/off modulator to adjust the duty cycle of the power supplied to one or more of the RF circuits. The time duration of the off time of the duty cycle is less than the time duration of the predetection interval. The effect of the on/off modulation is to reduce the signal strength by "stealing" short durations of time out of the IF signal. When the operating power for the RF circuit is off, an uncorrelated bit source provides a signal to the correlation system as a substitute for the IF signal. Because the off time duration is less than the predetection interval the correlator system receives the IF signal for at least part of the predetection interval enabling the correlator system to continue to correlate the IF signal to the replica and to provide valid location determination information. A reference oscillator generates a reference signal used in the correlator system, the local oscillator system, the quantizer, and the source. The on/off modulator adjusts the duty cycle of the operating power in the RF section either by adjusting the off time duration while holding the on/off cycle time duration approximately constant or by adjusting the on/off cycle time duration while holding the off time duration approximately constant.

An advantage of the present invention is that power consumption is reduced in the GPS receiver while the GPS receiver continues to correlate the GPS signal and to provide the location fix to a user.

These any other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
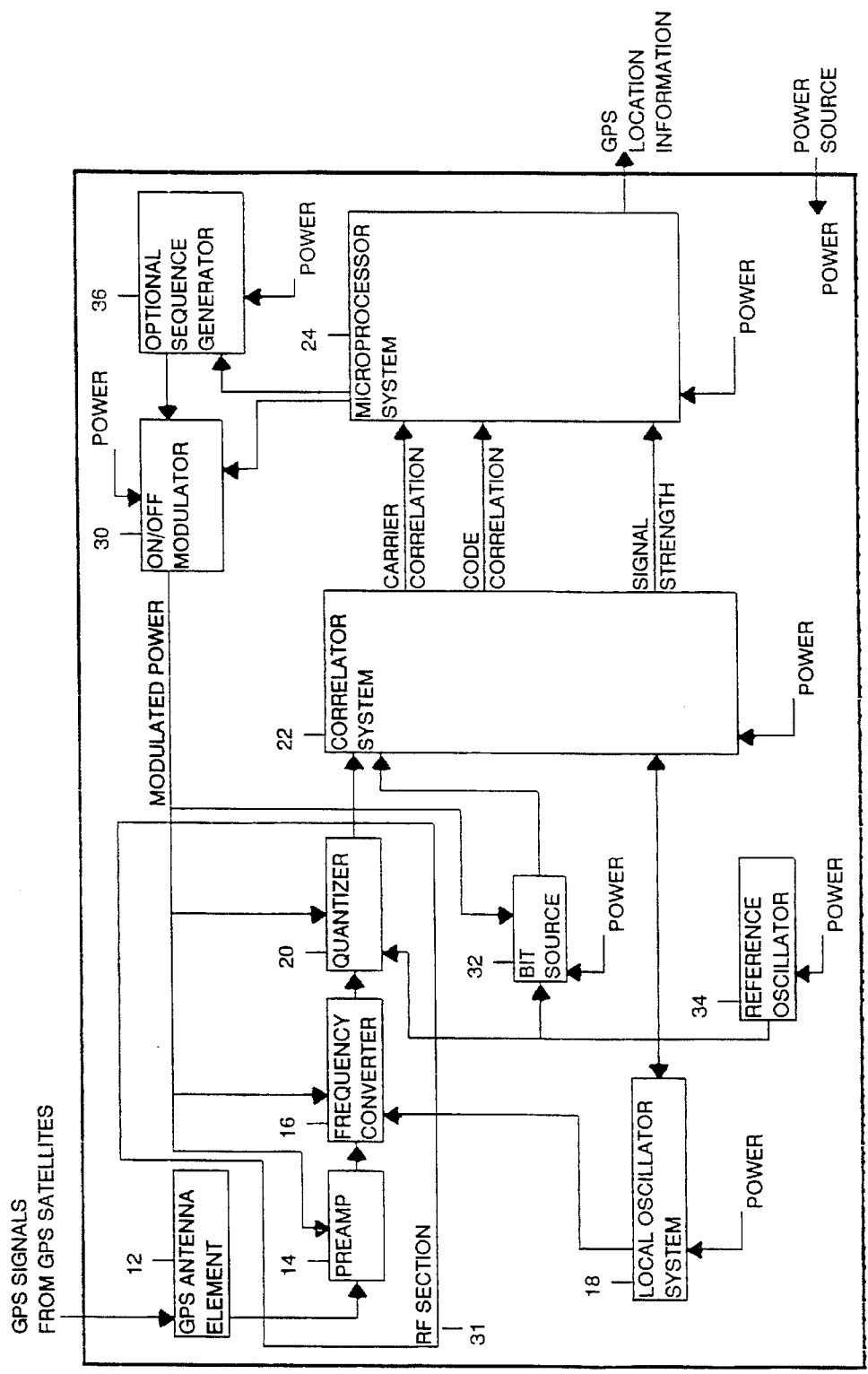
FIG. 1 is a block diagram of a low power GPS receiver according to the present invention.

FIG. 1 illustrates a GPS receiver of the present invention referred to by the general reference number 10. A GPS antenna element 12 receives a GPS satellite signal from one or more GPS satellites having a line of sight from the satellite to the element 12. The element 12 issues an antenna signal to an optional preamp 14 having a noise figure of less than about 6 dB. The preamp 14 amplifies the antenna signal and passes the amplified GPS signal to a frequency downconverter 16. Optionally, the element 12 is housed separately and connected by an electrical cable to the preamp 14 or the element 12 and the optional preamp 14 are placed in one housing together and connected with an electrical cable to the frequency downconverter 16 placed in another housing. A local oscillator system 18 provides one or more local oscillator signals to the frequency downconverter 16. Where the noise figure of the input to the frequency downconverter 16 is less than about 6 dB the preamp 14 may be eliminated. The frequency downconverter 16 mixes the local oscillator signal with the amplified signal to provide an intermediate frequency (IF) signal. A quantizer 20 receives and quantizes the IF signal to provide a quantized IF signal having two or more levels. The quantized IF signal is represented by a bit stream having two levels where one bit has a 0 or a 1 state, or having more than two levels either by having more than one bit or by allowing each bit to take more than two states. Optionally, the quantizer 20 separates the IF signal in an I and a Q component, each component having a bit stream having one or more bits. The preamp 14, the frequency downconverter 16, and the quantizer 20 are RF circuits in an RF section 31.

A correlator system 22 receives the quantized IF signal and provides a correlation signal to a microprocessor system 24 for the correlation between the quantized IF signal and an internal GPS replica signal. The correlation signal includes location determination information from which a time of day and a location of the GPS antenna element 12 can be determined. The correlation signal further includes information from which a signal strength for the quantized IF signal can be determined. When the signal strength is high, the correlation signal indicates a strong correlation between the quantized IF signal and the replica signal. When the signal strength is low, the correlation signal indicates a weak correlation between the quantized IF and the replica signal. When the signal strength is equal to or above a minimum, the location determination information is valid.

The microprocessor system 24 including a bus a read only memory (ROM), and an executable program stored in the ROM, operates in a conventional manner to receive and to issue digital signals on the bus and to execute instructions in the executable program. The microprocessor system 24 measures a signal strength from the correlation signal and determines a duty cycle factor that reduces the signal strength to a minimum for a reliable location fix. The duty cycle factor and information for a predetection interval are provided in a power control signal to an on/off modulator 30. The on/off modulator 30 on/off modulates the power supplied to one or more RF circuits, including, the optional preamp 14, the frequency downconverter 16, and the quantizer 20.

The on/off modulation has an on time duration for the time duration when power is supplied to the RF circuit, an off time duration for the time duration when power is not supplied to the RF circuit, an on/off cycle time duration for the time duration between the initiation of two successive off states, and a duty cycle for the ratio of the on time duration to the on/off cycle time duration. The on/off modulator 30 adjusts the duty cycle of the on/off modulation of the operating power in the RF section 31 in response to the duty cycle factor. A bit source 32 receives the on/off modulation as a signal from the on/off modulator 30 and provides an uncorrelated signal to the correlation system 22 during the off time duration to replace the quantized IF signal. A reference oscillator 34 provides a reference clock signal to the local oscillator system 18, the quantizer 20, the correlator system 22, and the bit source 32. The correlator system 22 derives the replica signal from the reference clock signal, from adjustments to the replica signal calculated in the microprocessor system, and from stored or generated PRN codes matching the PRN codes of the GPS satellite signals.

The following section describes two variations of the on/off modulator 30. In each variation the on/off modulator 30 adjusts the duty cycle of the power supplied to the RF circuit in response to the duty cycle factor provided in the power control signal from the microprocessor system 24. The on/off modulator 30 adjusts the duty cycle from close to 100%, when the GPS satellite signal is weak, downward to as low as 4% when the GPS satellite signal strength is strong in order to provide the minimum signal strength for the valid location fix. In a first variation, the on/off modulator 30 adjusts the off time duration to adjust the duty cycle after selecting an on/off cycle time duration in the range of 25 ms to 10 us. In a second variation, the on/off modulator 30 adjusts the on/off cycle time duration after selecting an off time duration in the range of 1 ms to 1 us.

Optionally, the GPS receiver 10 includes a pseudorandom sequence generator 36 either as hardware or as program instructions in the executable program stored in the ROM included in the microprocessor system 24. The pseudorandom sequence generator 36 generates a pseudorandom signal and issues the signal to the on/off modulator 30. The on/off modulator 30 uses the pseudorandom signal to vary the off time duration in a range of 10% to 50% for a three standard deviation variation, to vary the on/off cycle time duration in a range of 10% to 50% for a three standard deviation variation, or to vary both the off time duration and the on/off cycle time duration in the range of 10% to 50% for a three standard deviation variation. When both the off time duration and the on/off cycle time duration are varied, the time durations may by varied in the same ratio or not. When the pseudorandom signal is used, the average duty cycle of the on/off modulation is responsive to the duty cycle factor calculated by the microprocessor system over a time period of not more than 10 predetection intervals. The use of the pseudorandom sequence improves the reliability of the correlation process when the operating power to the RF section is on/off modulated by eliminating the possibility of synchronization of the on/off modulation and other signals within the GPS receiver 10.

Figure 2A:
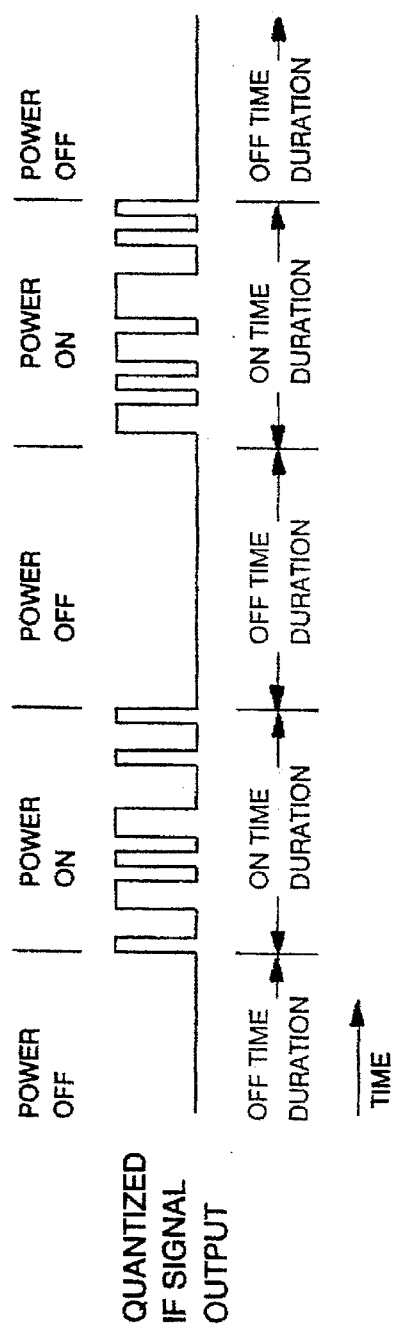
FIG. 2a is a waveform diagram for the time relationship between on/off modulated power supplied to an RF section and a quantized IF signal provided by the RF section in the GPS receiver of FIG. 1.

FIG. 2a illustrates an example of a time relationship between the on/of modulation and the quantized IF signal. The FIG. 2a shows the quantized IF signal versus time, started during an off time duration, followed with an on time duration, followed with an off time duration, followed with an on time duration, and followed with and ending in an off time duration. During the on time duration the RF section 31 provides the quantized IF signal, representative of the GPS signal, to the correlation system 22. During the off time duration, the bit source 32 provides the uncorrelated signal that is not representative of the GPS signal. Decreasing the duty cycle of the on/off modulation decreases the signal strength by reducing the ratio of the time duration that the quantized IF signal is available for correlation. When the GPS satellite signal is strong, the duty cycle will be low in order to provide the maximum reduction in power consumption while still retaining enough signal strength to provide a valid location fix. When the GPS satellite signal is weak, the duty cycle will be high in order to retain enough signal strength to provide a valid location fix.

Figure 2B:
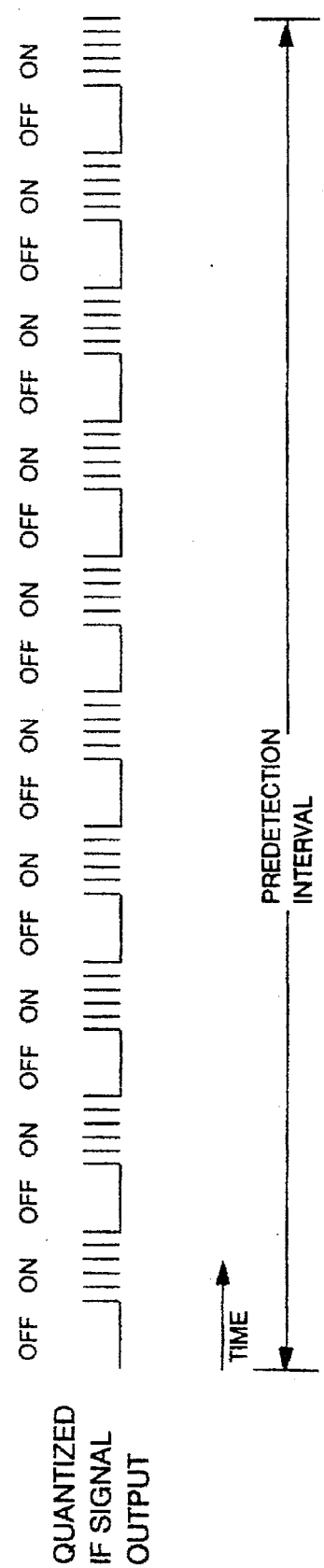
FIG. 2b is a waveform diagram for the time relationship between the quantized IF signal of FIG. 2a and a predetection interval used in a correlation of a GPS signal.

FIG. 2b illustrates an example of a time relationship between the on/off modulated quantized IF signal and the predetection interval used to correlate the replica signal to the quantized IF signal. The FIG. 2b shows a 50% duty cycle and ten off time durations within one predetection interval. The predetection interval is selected from the range of 1 ms and 25 ms. A short predetection interval typically provides a faster acquisition of GPS signals and better location accuracy when the location of GPS antenna element 12 is undergoing acceleration. A long predetection interval typically provides better capability to correlate a GPS signal when the GPS antenna element 12 is beneath foliage or within a building. The predetection intervals follow one after the other, the correlation signals being provided for each predetection interval to give the appearance of a continuous correlation process.

Figure 2C:
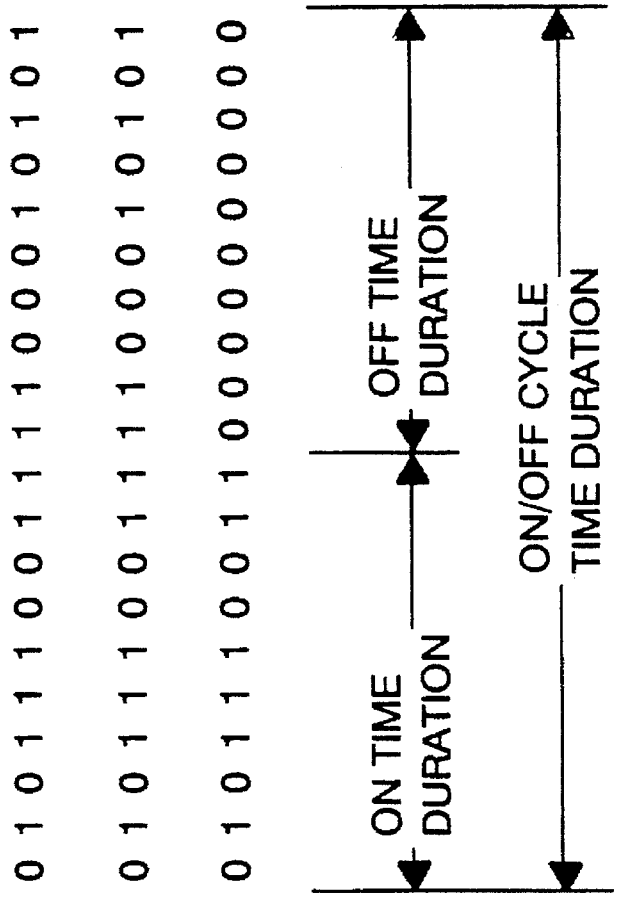
FIG. 2c is a bit stream diagram for the correlation of the quantized IF signal of FIG. 2a and FIG. 2b.

FIG. 2c illustrates an example of a 20 bit section of the quantized IF signal bit stream with no on/off modulation, a 20 bit section of the replica signal bit stream, and a 20 bit section of the input to the correlator system 22 including 10 bits from the quantized IF signal bit stream during the on time duration followed by 10 bits from the bit source 32 during the off time duration. The quantized IF with no modulation and the replica are shown as 100% correlated. The modulated quantized IF and the replica signal are shown as 100% correlated during the on time duration, 00% correlated during the off time duration, and 50% correlated for the entire on/off cycle. Typically, noise in the IF signal would prevent 100% correlation even with no on/off modulation. In the GPS receiver 10, a correlation in the range of 3% to 16% indicates the minimum signal strength for a valid location fix. In the FIGS. 2a, 2b, and FIG. 2c, the substitute bit stream from the bit source 32 is illustrated as all 0's. Optionally, the bit source 32 may provide a substitute bit steam of all 1's, a random sequence of 0's and 1's, a pseudorandom sequence of 0's and 1's, or a fixed sequence of 0's and 1's.

Figure 3:
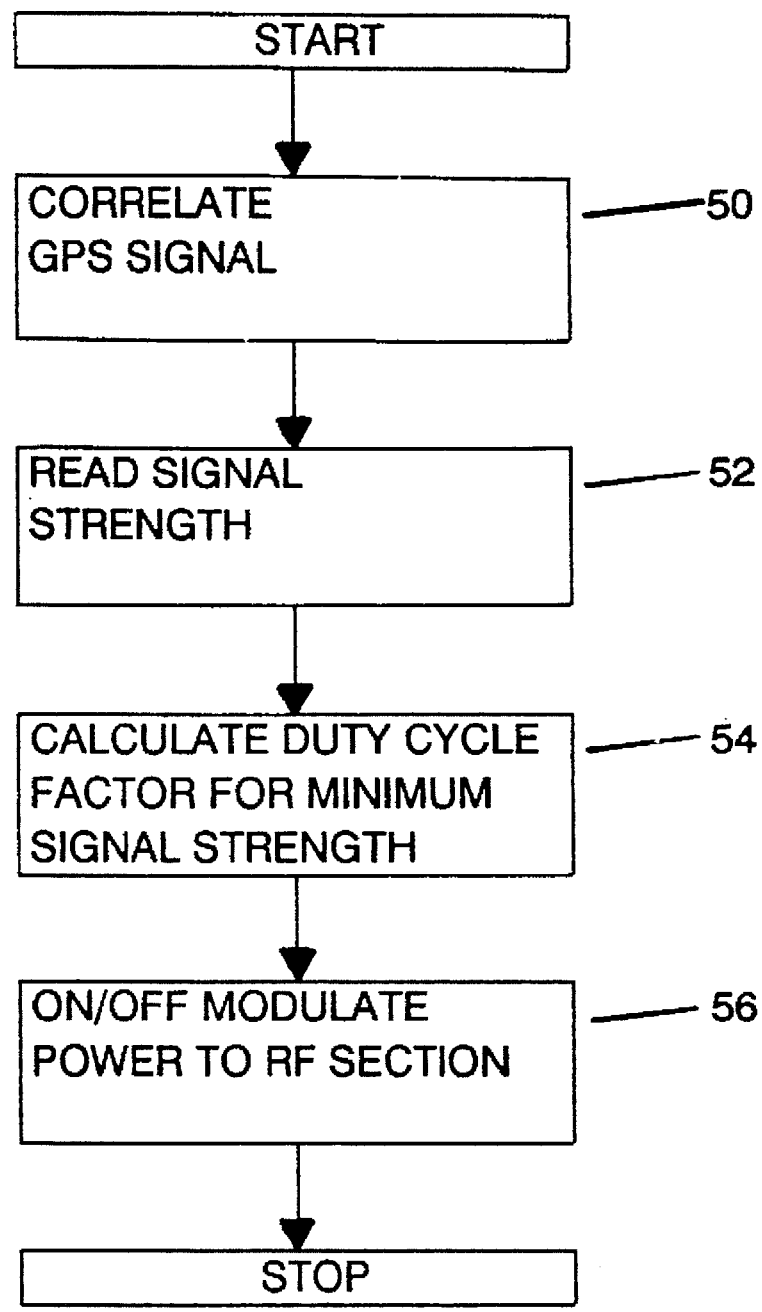
FIG. 3 is a flow chart of a method for reducing power consumption in the GPS receiver of FIG. 1 by on/off modulating the power supplied to the RF section.

FIG. 3 illustrates a method for reducing the power consumption in the GPS receiver by reducing the power consumption in one or more of the RF circuits including the preamp 14, the frequency downconverter 16, and the quantizer 20. The method starts when the RF section 31 is providing the quantized IF signal to the correlator system 22. In step 50, the correlator system 22 correlates the internal replica signal to the IF signal and provides a correlation signal to the microprocessor system 24. The correlation signal includes information for location determination of the GPS antenna element 12 and for signal strength of the IF signal. In step 52 the microprocessor system 24 reads the signal strength of the on/off modulated IF signal. In step 54 the microprocessor system 24 calculates and issues a power control signal including the duty cycle factor to reduce the signal strength to the minimum for a valid location fix. In step 56 the on/off modulator 30 modulates the power supplied the RF circuit adjusting the duty cycle of the on/off modulation to correspond to the duty cycle factor. When the operating power is modulated off, the bit source 32 provides the uncorrelated signal to substitute for the quantized IF signal.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A low power GPS receiver to receive a GPS signal having information for determining a location fix from one or more GPS satellites and to provide the location fix, the GPS receiver including;

an RF section to receive a GPS signal from a GPS antenna element and to provide an intermediate frequency (IF) signal representative of the GPS signal;

a correlator system to receive the IF signal, to correlate the IF signal for a time duration of a selected predetection interval, and to issue a correlation signal having information for location determination and signal strength;

a microprocessor system to receive the correlation signal, to determine a duty cycle factor that reduces the signal strength without inhibiting a valid location fix, to issue information for the duty cycle factor in a power control signal, and to provide a location fix in a user output signal; and an on/off modulator, to receive power from a power source, to receive the power control signal, and to on/off modulate the operating power to the RF section, the on/off modulation to have an off time duration of less that the predetection interval and to have a duty cycle responsive to the duty cycle factor.

2. The GPS receiver in claim 1, wherein the on/off modulator adjusts the duty cycle by adjusting the off time duration.

3. The GPS receiver in claim 2, wherein the on/off modulator selects an on/off cycle time duration in the range of 25 ms to 10 us.

4. The GPS receiver in claim 2, further including a pseudorandom sequence generator to provide a pseudorandom sequence in a signal to the on/off modulator.

5. The GPS receiver in claim 4, wherein the on/off modulator applies the pseudorandom sequence to vary at least one of (i) the off time duration and (ii) the on/off cycle time duration.

6. The GPS receiver in claim 1, wherein the on/off modulator adjusts the duty cycle by adjusting the on/off cycle time duration.

7. The GPS receiver in claim 6, wherein the on/off modulator selects the off time duration is in the range of 1 ms to 1 us.

8. The GPS receiver in claim 6, further including a pseudorandom sequence generator to provide a pseudorandom sequence in a signal to the on/off modulator.

9. The GPS receiver in claim 8, wherein the on/off modulator applies the pseudorandom sequence to vary at least one of (i) the off time duration and (ii) the on/off cycle time duration.

10. A method for reducing power consumption by on/off modulating operating power to an RF section in a GPS receiver receiving one or more GPS satellite signal having location determination information where the receiver continues correlating a GPS signal and providing a location fix, the method including the steps of:

providing an RF section to receive a GPS signal from a GPS antenna element and to provide an intermediate frequency (IF) signal, representative of the GPS signal;

providing a correlator system to correlate the IF signal within a time duration of a predetection interval and to issue a correlation signal having information for location determination and for signal strength;

determining a duty cycle factor in a microprocessor system receiving the correlation signal, the duty cycle factor for reducing the signal strength without inhibiting a determination of a valid location; and modulating on/off the operating power supplied to the RF section, the on/off modulation to have an off time duration of less that the predetection interval and to have a duty cycle responsive to the duty cycle factor.

11. The method in claim 10, wherein modulating the operating power further includes the step of adjusting the duty cycle by adjusting the off time duration.

12. The method in claim 11, wherein modulating the operating power further includes the step of selecting a constant on/off cycle time duration in the range of 25 ms to 10 us.

13. The method in claim 11, wherein modulating the operating power further includes the steps of providing a pseudorandom sequence generator to issue a pseudorandom sequence in a signal, applying the pseudorandom sequence to vary at least one of (i) the off time duration and (ii) the on/off cycle time duration.

14. The method in claim 10, wherein modulating the operating power further includes the step of adjusting the duty cycle by adjusting the on/off cycle time duration.

15. The method in claim 14, wherein modulating the operating power further includes the step of selecting a constant off time duration in the range of 1 ms to 1 us.

16. The method in claim 14, wherein modulating the operating power further includes the steps of providing a pseudorandom sequence generator to issue a pseudorandom sequence in a signal, applying the pseudorandom sequence to vary at least one of (i) the off time duration and (ii) the on/off cycle time duration.

* * * * *